United States Patent Office 3,487,124
Patented Dec. 30, 1969

3,487,124
LACQUER COMPOSITIONS CONTAINING A POLY-
EPOXIDE, A PHENOLIC RESOLE AND OXIDIZED
POLYETHYLENE
Leon Yeshin, 9 Winteringham Road, St. Neots,
Huntingdonshire, England
No Drawing. Filed Mar. 1, 1967, Ser. No. 619,550
Claims priority, application Great Britain, Mar. 3, 1966,
9,394/66
Int. Cl. C08g 45/06
U.S. Cl. 260—831       3 Claims

ABSTRACT OF THE DISCLOSURE

This invention pertains to improved lacquer compositions containing up to about 15% by weight of oxidized high density polyethylene having a designated carbonyl content and particle size and articles having such lacquers coated thereon. The lacquers are particularly adapted for application to metal substrates.

---

This invention relates to lacquers having good bonding characteristics and to their production and use. It is especially concerned with the so-called sanitary lacquers which are applied to metal substrates which are to be used in containers for food or beverages or in closures for such containers.

Sanitary lacquers must of course be capable of good adhesion to the metal substrate, must be free from any tendency to impart a flavor to the contents of the container, and must be soluble in readily available solvents. Materials which are commonly used include oleo-resinous, vinyl and epoxyphenolic lacquers.

In the manufacture of such containers and closures, it is frequently required to use a polymeric adhesive, a sealing compound, or a closure seal such as a liner or gasket. One of the main problems arising is the difficulty in obtaining satisfactory adhesion between such adhesive compound or seal and the lacquer coating. Many methods have been developed to overcome this difficulty, one of which is the use of vinyl plastisols on vinyl lacquers; in this method, the plasticizer used in the plastisol softens the lacquer and so gives a good bond between the two. This has however the disadvantage that it is restricted to vinyl lacquers, which are not suitable for all applications, and is not applicable to all sealing materials.

It is often desirable to use a polyolefin material such as polyethylene as an adhesive or a closure seal or sealing compound. However, it has been very difficult in the past to obtain satisfactory adhesion between such a polyolefin and the lacquer coated, or indeed an uncoated, metal substrate, and such methods as have been put forward in attempts to overcome this difficulty, e.g., the use of a separate tie-coat of polyethylene on the lacquered surface, and the use of polyolefins specially with additives such as polyvinyl acetals, cyclised rubber resins, and chlorosulphonated polyethylene and other halogenated polyolefins, have obvious general disadvantages. Moreover such additives usually have specific disadvantages, such as imparting brittleness, bad taste or odor, or poor aging properties to the polyolefin.

It has now been found that lacquers such as those indicated above can be modified in such a way that polyolefins can be caused to adhere strongly to them by the simple application of heat and pressure.

In one aspect the invention comprises lacquer compositions, especially but not exclusively vinyl, epoxy-phenolic and oleo-resinous lacquer compositions, containing 1–15% by weight (based on total solids) of a particulate oxidized high density polyethylene of carbonyl content at least 0.4 meq./g. (milli-equivalent/gram) having a particle size below 500 microns.

The invention further comprises materials and articles, e.g., metal sheets, such as, for example, tin plate, and articles such as, for example, containers or crown shells made from tin plate, in which one or both surfaces have a lacquer coating obtained from a lacquer composition as described above, as also materials and articles comprising such a lacquer-coated material or article, to which adheres a layer or body of a polyolefin either as an adhesive or as a self-sufficient element or component, and the production of such materials and articles.

The oxidized polyethylene preferably has a molecular weight (weight average- of 2,600–60,000, a density at 25° C. between 0.95 and 1.1, a ball and ring softening point between 120° and 160° C., and a total carbonyl content of at least 0.5 and preferably at least 0.6 meq./g. The upper limit for the molecular weight is, however, in no way critical, and material of molecular weight higher than 60,000 could be used provided they could be obtained on a technical scale.

The lacquer preferably contains 2–5% by weight of the particulate oxidized polyethylene. The particle size of the oxidized polyethylene is preferably within the range 10–40 microns, though it can be higher if desired, up to the maximum figure of about 500 microns. Particles of size less than 10 microns are effective, but are not easy to obtain.

The lacquer composition comprising the finely divided oxidized polyethylene is preferably obtained simply by stirring the finely divided oxidized polyethylene into the lacquer solution. The particulate oxidized polyethylene may be produced by precipitation from solution; thus the oxidized polyethylene may be dissolved in a suitable solvent such as toluene or xylene at an elevated temperature, e.g., about 80° C., and the solution cooled with stirring so as to cause the oxidized polyethylene to precipitate as a dispersion of fine particle size. If the lacquer system is compatible with the toluene or xylene or other solvent, the dispersion may be added directly to it; if it is not, an inversion in a suitable solvent may be carried out.

When the lacquer composition is in the form of a latex or a water-based lacquer or varnish, the oxidized polyethylene may be added as an emulsion in water containing a suitable emulsifier. Such emulsions are described for example in British Patent No. 997,135 and U.S. Ser. No. 411,583 filed Nov. 16, 1964, now Patent No. 3,434,993, Mirabile et al.

The lacquer containing the oxidized polyethylene can be coated onto a metal substrate in a known way, as by spraying, dipping, brushing or a roller technique, after which it is stoved to remove the solvent or other vehicle, and when the lacquer is one which requires curing, to effect the cure.

Lacquered metal objects so obtained have in themselves certain advantages over similar objects having known lacquer coatings. For example, the metal has a smooth low friction surface, which prevents blocking or sticking of stacked sheets of tin plate. Also, the usual drawing lubricants which are used in the stamping and forming of tin plate are no longer necessary; this in itself helps to improve adhesion between the lacquered metal substrate and a thermoplastic adhesive compound in a subsequent operation, and in particular the adhesion of a polyolefin.

Polyolefins which may be bonded to the lacquered surfaces of the invention may consist, for example, of high or low density polyethylene or of atactic or isotactic polypropylene or other poly-α-olefin. A particular valuable application of the invention is to the bonding of high density polyethylene to the lacquered surface.

The invention may be applied, for example, to the manufacture of tin cans from tin plate coated with the lacquer, in which a polyolefin adhesive composition is employed as a side-seam cement to seal the seam of the can.

Another very valuable application is in the production of closures, including crown shells, from lacquered tin plate, in which a polyolefin or modified polyolefin liner or gasket is inserted into the closure (crown shell) and caused to adhere thereto.

Other applications of the invention include the production of decorative and functional polyolefin metal laminates, and the production of low friction protective surface coatings, such as meat release lacquer coatings such as are used on the internal surface of cans for meat.

The effectiveness of the invention is demonstrated by the following examples, in which there was used an oxidized high density polyethylene having the following properties:

Molecular weight _____ 7,800
Density at 25° C. _____ 0.991
Ball and ring softening point _____ °C__ 147
Carbonyl content _____ meq./g__ 0.71
Total oxygen content _____ 3.06

EXAMPLE 1

The finely divided oxidized high density polyethylene, and in control experiments particulate low density polyethylene and oxidized low density polyethylene, of particle size ranging from 10 to 40 microns, were added to an epoxy-phenolic lacquer of the following composition:

| | Percent |
|---|---|
| Epikote 1007 (epichlorohydrin bisphenol A condensate; epoxide equivalent 1700–2000, M.P. 125°–132° C.) | 28 |
| Scadoform L9 (resol-like phenolformaldehyde resin acid number 0.5) | 17 |
| n-Butanol | 3 |
| Diacetone alcohol | 26 |
| Shellsol A (highly refined petroleum hydrocarbon solvent, distillation range 162° C. 98% aromatic) | 26 |
| Totals solids | 40 |

The lacquer compositions so obtained were roller coated onto electrolytic tin plate 0.28–0.31 mm. thick. The coatings were stoved at 200° C. for 15 minutes, and were 5–10 microns thick.

The lacquered tin plate samples were then used to prepare joints with polyethylene for lap and peel strength measurements. The lap strength samples were laminates of the lacquered tin plate and of low density polyethylene (density 0.916 and melt index 7.0). They were prepared with a 2.5 cm. overlap by heating the polyethylene/tin plate laminate in a hydraulic press at 150° C. for 8 minutes, and applying a load of 4536 kg. for 2 minutes, after which they were cooled under pressure. The lap strength measurements were made on a Hounsfield Tensometer (508 kg. beam and 5.1 cm. per minute strain rate). The laminates for the peel strength measurements were prepared as for the lap joint, except that they were suitable for a peel test, using a 2.54 cm. square overlap. The test was carried out on a Hounsfield Tensometer (28.4 kg. beam, 5.1 cm. per minute strain rate).

To determine the effect of boiling water on the adhesive bond, 2.54 cm. square overlap joints were prepared from the lacquered tin plate used in the lap strength measurements. The lap joints were boiled in water for 4 hours, and after cooling the lap strength was measured as before.

The results obtained are shown in the following table.

TABLE I.—COMPOSITION OF LACQUER AND POLYETHYLENE-LACQUER ADHESION

| Specimen Number | Lacquer Composition | | Adhesion | | |
|---|---|---|---|---|---|
| | Particulate Additive | | | Lap Strength after immersion in boiling water | Peel Strength |
| | Nature | Amount* | Lap Strength | | |
| 1 | Low density polyethylene | 2.5 | No adhesion | No adhesion | No adhesion. |
| | do | 5.0 | do | do | Do. |
| | do | 12.5 | do | do | Do. |
| 2 | Oxidized low density polyethylene | 12.5 | 7.08 kg./cm.² | | 0.54 kg./cm. |
| 3 | do | 12.5 | 7.71 kg./cm.² | | 0.72 kg./cm. |
| 4 | do | 12.5 | 8.58 kg./cm.² | | 3.6 kg./cm. |
| 5 | Oxidized high density polyethylene | 2.5 | 33.7 kg./cm.² | 36.4 kg./cm.² | 1.8 kg./cm. |
| | | 5.0 | 38.6 kg./cm.² | 39.6 kg./cm.² | 2.2 kg./cm. |
| | | 12.5 | 40.5 kg./cm.² | 39.2 kg./cm.² | 2.7 kg./cm. |
| Control | No addition | | 7.34 kg./cm.² | | No adhesion. |

*Weight percent on solids content of lacquer.

The types of polyethylene added to the epoxy-phenolic lacquer were as follows:

Specimen No. 1—Low density polyethylene:
  Density _____ 0.916
  Melt index _____ 20
Specimen No. 2—Oxidized low density polyethylene:
  Density _____ 0.938
  Melt index _____ 65,000
  Total carbonyl _____ meq./g__ 0.77
  Total oxygen _____ percent__ 3.61
Specimen No. 3—Oxidized low density polyethylene:
  Density _____ 0.951
  Melt index _____ 41,000
  Total carbonyl _____ meq./g__ 0.87
  Total oxygen _____ percent__ 4.43
Specimen No. 4—Oxidized low density polyethylene:
  Density _____ 0.944
  Melt index _____ 45,000
  Total carbonyl _____ meq./g__ 0.71
  Total oxygen _____ percent__ 3.62
Specimen No. 5—Oxidized high density polyethylene:
  Density _____ 0.991
  Melt index _____ 1,900
  Total carbonyl _____ meq./g__ 0.71
  Total oxygen _____ percent__ 3.06

*Control.*—As a further control there was used the epoxy-phenolic lacquer without any addition of polyethylene.

It will be seen from the results of the adhesion measurements that the incorporation in the lacquer of particulate oxidized low density polyethylene has no significant effect on the adhesive bond between the lacquer and the polyethylene, but that the use of particulate oxidized high density polyethylene increases the adhesion remarkably. The fact that the adhesive bond obtained in this case is capable of resisting immersion in boiling water for prolonged periods greatly increases its usefulness.

EXAMPLE 2

The adhesion of a number of modified polyolefins to tin plate coated with the lacquer containing the particulate oxidized high density polyethylene has been measured. In this case an epoxy-phenolic lacquer containing 2% of the particulate oxidized polyethylene of Specimen No. 5 in Example 1 was employed, and the specimens for lap strength measurements were made with a 2.54 cm. overlap in a hydraulic press under a pressure of 4536 kg. and at a temperature of 10–30° C. above the softening point of the polymer. The lap strength measurements were made as before.

The range of materials used and the results of the lap strength measurements are given in Table II.

TABLE II

| Adhering material: | Lap strength, kg./cm.$^2$ |
|---|---|
| Low density polyethylene—Density, .916 and melt index, 7 | 39.2 |
| High density polyethylene—Density, .960 and melt index, 2.5 | 142.8 |
| Low density polyethylene—irradiated to 10 megarads | 42 |
| Polypropylene—Density, .908 and melt index, 0.3 | 42 |
| Carboxyl-modified polyethylene (Surlyn A) | 117.6 |
| Nylon 11 (Rilsan) | 194.6 |
| Polystyrene | ($^1$) |
| Polyacetal | ($^1$) |
| Polycarbonate | ($^1$) |

$^1$ No adhesion.

It will be seen from the above results that the invention makes it possible to modify a normal lacquer composition in such a way as to enable it to adhere exceptionally strongly to polyolefins and modified polyolefins, and also to nylons (high linear polyamides) and branched polyamides of moderate or high molecular weight, where previously it was impossible to obtain a significant degree of adhesion at all. Moreover it has been shown that the adhesive bonds obtained are not seriously affected by immersion in boiling water.

EXAMPLE 3

The same lacquer composition containing 2% of the same oxidized polyethylene as in Example 1 was coated onto 0.23 mm. thick aluminum sheet and 0.18 mm. thick tin plate, to give a film 2.5 microns thick, and the lacquer was stoved at 200° C. for 15–20 minutes. The lacquered aluminum and tin plate were used to prepared joints for lap and peel strength measurements all by the procedure described in Example 1. The measurements were repeated using a lacquer coating 5 microns thick. Samples were also prepared by an alternative heating cycle, in which the coated samples of tin plate and aluminum were laminated with low density polyethylene to give specimens for lap and peel strength measurements by heating the metal polyethylene laminate at 245° C. for 15 seconds at contact pressure and then pressing at 245° C. for 45 seconds at 4536 kg. load.

In all cases the thickness of the polyethylene in the laminate was 0.075 mm.

The results of the lap and peel strength measurements are shown in the table:

TABLE III

| Specimen No. | Metal | Lacquer thickness | Temperature of bond formation, °C. | Lap strength | Peel strength, kg./cm. |
|---|---|---|---|---|---|
| 6 | Aluminum | 2.5 | 150 | Metal failure | 0.5–1.8 |
| 7 | Tin plate | 2.5 | 150 | do | 0.5–8.3 |
| 8 | Aluminum | 5 | 150 | do | 1.8 |
| 9 | Tin plate | 5 | 150 | do | 2.3 |
| 10 | Aluminum | 2.5 | 245 | do | 2.3 |
| 11 | Tin plate | 2.5 | 245 | do | 3.2 |

Having thus described the invention, it is not intended that it be limited except as set forth in the following claims.

What is claimed is:
1. Lacquer compositions comprising 1–15% by weight (based on total solids) of a particulate oxidized high density polyethylene of carbonyl group content of at least 0.4 milli-equivalent/gram and particle size below 500 microns and a lacquer base, the polymeric components of which consist essentially of polyglycidyl ethers of polyhydric phenols and resole phenol formaldehyde condensates.

2. Lacquer compositions according to claim 1 wherein the oxidized polyethylene has a molecular weight of at least 2600, a density at 25° C. between 0.95 and 1.1, a ball and ring softening point between 120° and 160° C,. and a carbonyl group content of at least 0.5 milli-equivalent/gram.

3. Lacquer compositions according to claim 1 wherein the particle size of the oxidized polyethylene is not greater than 40 microns.

References Cited

UNITED STATES PATENTS 2,983,698  5/1961  Tucker _____ 260—831
3,434,993  3/1969  Mirabile et al. _____ 260—29.6

MURRAY TILLMAN, Primary Examiner
PAUL LIEBERMAN, Assistant Examiner

U.S. Cl. X.R.

117—132, 138, 8; 161—183, 184, 186; 260—47, 334, 33.6, 836, 837